Aug. 22, 1933.　　　F. A. FURLONG　　　1,923,260

FLOW METER

Filed Feb. 24, 1930

Inventor
Francis A. Furlong
per James B. Lewis
Attorney.

Patented Aug. 22, 1933

1,923,260

UNITED STATES PATENT OFFICE 1,923,260

FLOW METER

Francis A. Furlong, Chicago, Ill., assignor to Republic Flow Meters Company, Chicago, Ill., a Corporation of Illinois Application February 24, 1930. Serial No. 430,678

7 Claims. (Cl. 177—351)

This invention relates to improvements in indicating instruments such as flow meters and more particularly to that type of meters known as electric flow meters.

In electrical flow meters the differential head is translated into electrical energy and the rate of flow indicated by suitable electrically operated instruments. Translating means have been proposed for this purpose, an example being shown in Patent No. 1,601,743 granted October 5, 1926, wherein the resistance of an electric circuit is varied by variation of a conducting liquid responsive to the differential head. In the type of device shown in the patent the conducting liquid is carried by a bell float responsive to the differential pressure. Translating devices of this type are, however, open to the objection that the float is unstable; that is, it tends to tip over, due to top heaviness, because its center of gravity is above its center of buoyancy and guides are necessary to maintain the float in upright operative position. With the use of guides there is a tendency of the moving parts to stick, due to frictional resistance, which interferes appreciably with the sensitiveness of such meters. Furthermore, progressive submergence of the contact rods in the conducting liquid diminishes the surface area of said liquid resulting in an undue rise of the liquid in the contact chamber. Also the progressive withdrawal of the rods increases the area of the liquid with the result that the level of liquid is unduly lowered. These improper variations in the level of the conducting liquid, in the contact chamber, introduce inaccuracies in the indications.

The present invention has for one of its objects the provision of a stabilized float arrangement wherein the float normally remains in an upright operative position without the aid of auxiliary sustaining means such as guides and which shall be highly sensitive to extremely small variations in differential pressure.

Another object of the invention is the provision of a float assembly having its center of buoyancy above its center of gravity.

A further object of the invention is the provision of means for maintaining the surface area of the conducting liquid constant throughout the range of movement of the float.

A still further object of the invention is the provision of a resistance assembly wherein the ratio of the rise and fall of the conducting liquid to increase and decrease of the differential pressure is maintained uniform.

A particular purpose of the invention is the provision of a flow meter suitable for the measurement of fluids whose velocity produces a low differential pressure.

The various features of novelty which characterize the invention will be well understood by reference to the following description of an illustrative embodiment thereof shown, by way of example, in the accompanying drawing, wherein.

Figures 1, 2:
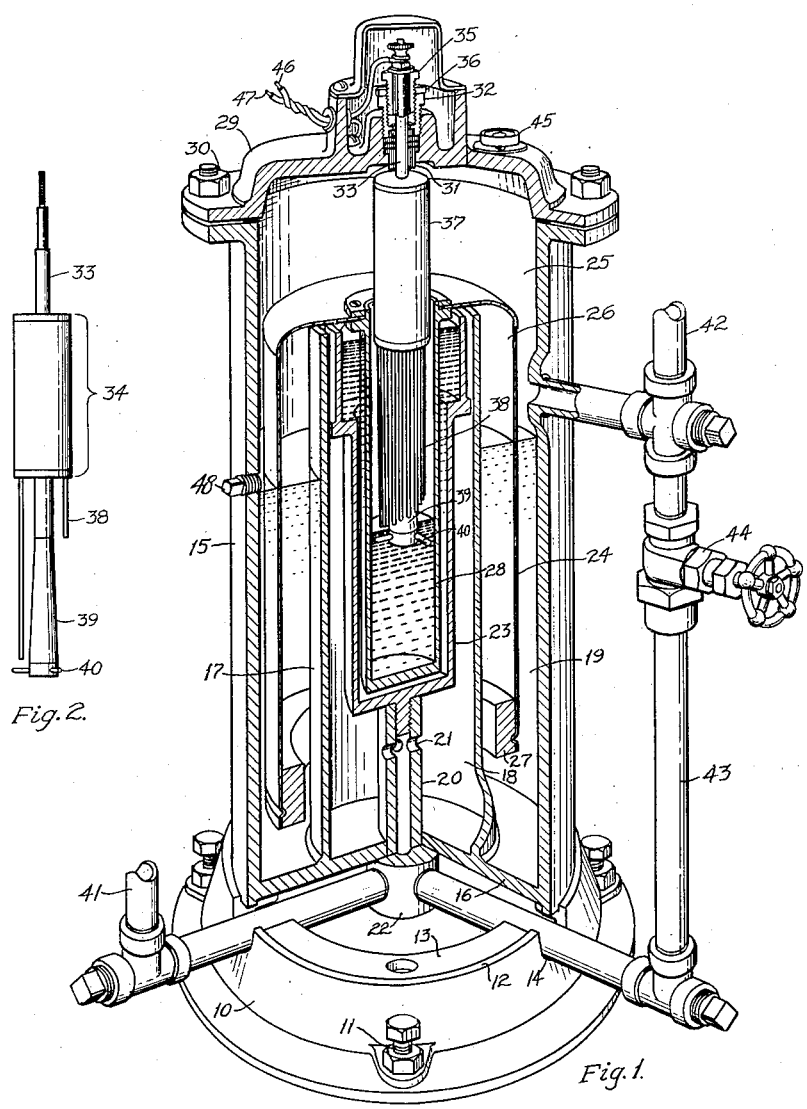
Figure 1 shows a vertical section through a meter, the construction of which illustrates a preferred form of the invention.
Figure 2 shows a combined resistance assembly and displacer.

Referring more specifically to the exemplary embodiment of the invention illustrated in the drawing, the numeral 10 indicates a base provided with suitable leveling screws 11 by which the base may be adjusted to a level position notwithstanding irregularities in the supporting structure upon which the meter may be positioned. The upper portion of the base is provided with a flange 12 surrounding a seat 13 provided with apertures through which means can be passed to secure the meter casing in position on the base. The base may be cut away or otherwise provided with openings 14 through which suitable pressure pipes extend for a purpose later described.

The meter body comprises an elongated hollow casing 15 closed at one end by a wall 16 and open at the other end. Secured to and extending from the wall 16 is an inner shell 17 which divides the interior of the casing 15 into an interior central well 18 and an exterior annular well 19. The shell 17 is secured to the wall 16 as by welding or otherwise so as to provide a fluid tight joint therebetween. The annular well 19 is filled, to the level of the plug 48, with liquid such as oil which acts as a seal for a bell-shaped float, the sides of which extend into the well and are sealed by the liquid therein. Extending through the wall 16 and terminating within the well 18 is a hollow tube 20 the upper end of which is threaded and said tube is further provided with one or more openings 21 for providing communication between the interior thereof and the well. That portion of the tube below the wall 16 is in communication with the interior of a header 22 which is threaded or otherwise provided for the reception of suitable pipes through which pressure is transmitted to the interior of the float. A chamber 23, having a threaded portion complementary to the threaded portion of tube 20, is adapted to be supported by the tube 20. The chamber occupies a position within the central well 18 and is adapted to be partially filled with a liquid, such as mercury.

A bell-shaped float 24, the sides of which extend into and are sealed by the liquid in well 19, divides the interior of the casing above the liquid into a low pressure chamber 25 and a high pressure chamber 26. The float is preferably made of thin metal and the sides thereof are spaced from the walls of well 19 to permit of vertical movement of the float in the well and a weight 27 is conveniently secured to the bell, preferably at the lower end thereof, to give added weight thereto and to otherwise add to the stability of the float. The float carries at its upper end a contact chamber 28 movable freely in the chamber 23 without contacting with the side walls thereof. This contact chamber, sealed to the float around an opening in the top thereof, is subject to the buoyant action of the liquid in chamber 23 and supports the float in operative position.

In measuring instruments of this type where accuracy and sensitivity are the principal requirements it is necessary that the moving parts move with the least friction possible. This prerequisite is accomplished in the present device by stabilizing the float so that it floats in an upright position throughout its range of movement. This important feature is accomplished by arranging the component parts of the float so that the center of gravity of the float is below its center of buoyancy. By this arrangement the float does not tip or lean to one side as in the case where the float is top heavy and the necessity for guides to maintain the float in upright position is eliminated.

The upper end of the casing 15 is closed by a cover 29, provided with a central opening lined with a bakelite or other non-conducting bushing 31 held in place by a gland nut 32 and the cover is secured to the meter casing as by bolts 30 or other suitable means.

A terminal post 33 of a resistance unit 34 extends through the bushing 31 and gland nut 32 and is provided with a thumb nut whereby an electrical conductor such as a lead wire may be held in conducting relation to said post. The terminal post carries a micrometer screw 35 which engages a correspondingly threaded portion of the gland nut 32 and by means of which the position of the resistance unit 34 may be accurately adjusted. The screw 35 can be locked in any adjusted position by a lock nut 36 and a cap, secured to the cover, houses the terminal post and micrometer screw to prevent water, dust etc. accumulating thereon and to prevent unauthorized tampering therewith.

The resistance unit 34 comprises a plurality of resistances connected in series, conveniently enclosed within the body 37, and from which a series of graduated contact rods 38 depend. These rods are adapted to progressively contact with the conducting liquid in chamber 28 as the position of the float is varied by the differential pressure. As the resistance unit per se forms no part of the present invention further description thereof is deemed unnecessary, suffice it to say, however, that a full description of the structure, function and operation thereof can be had by reference to Patent No. 1,325,763 granted December 23, 1919.

Progressive contact with and submergence of the rods 38 in the conducting fluid in chamber 28 correspondingly reduces the surface area of the liquid as the float rises and the successive withdrawal of said rods, as the float descends, increases the surface area of the liquid in a like manner. This phenomenon causes an improper number of contacts to be made and broken as the float responds to variations in differential pressure, and results in an erroneous registration on the part of the indicating instruments. It therefore follows that if accuracy of indication is to be obtained the ratio of the movement of the conducting liquid to variations in differential pressure must be maintained uniform. To this end several arrangements suggest themselves, the most feasible being either a variation in the size of chamber 28 or the use of a displacer. From a practical view point the latter lends itself more readily to ease of manufacture and accordingly such a displacer is illustrated in Figure 2 of the drawing.

In accordance with the illustration the displacer is shown as carried by the resistance unit although it is obvious that it could be otherwise supported. As shown the displacer 39 comprises a rod, preferably of non-conducting material, having its upper end secured to the lower part of the body portion of the resistance unit 34 and of greater length than the longest contact rod. That part of the displacer lying between the longest and shortest rods is so shaped that the sum of the cross-sectional area of the displacer at any point and the rods at the same point is approximately a constant quantity. With such a displacer the surface area of the conducting liquid is maintained constant and the ratio of the movement of said liquid to variations in differential pressure is maintained uniform with the result that the accuracy of the device is materially improved.

As a preventative against possible lateral drift of the float, pins 40 are provided. These pins, as shown, are conveniently carried by the free end of the displacer 39 and are adapted to cooperate with the interior walls of contact chamber 28 to keep this chamber centered with respect to chamber 23 and the resistance unit 34 thereby preventing frictional resistance between these parts. The pins 40 are of such length that there is ample space between the ends thereof and the adjacent chamber walls to permit freedom of movement of the float without constant contact therewith yet they are of such length that the chamber will contact with the pins before touching either the resistance unit 34 or the chamber 23.

A pressure pipe 41 having connection with the upstream side of a differential pressure device, such as a Venturi tube, orifice plate, Pilot tube or other device located in a conduit through which the fluid to be measured flows, is connected to the header 22 and the pressure therein is communicated to the interior of the float through the openings 21 in tube 20 and through well 18. A pressure pipe 42, connected with the down stream side of the differential pressure device, communicates with the interior of casing 15 above the level of the liquid therein and the exterior of the float is subjected to said pressure. A pipe 43 interconnecting pipes 40 and 41 provides a convenient arrangement for equalizing the pressures on the opposite sides of the float. During normal operation of the meter the valve 44 is closed but when it is desired to check up the meter this valve is opened to equalize the pressures above and below the float whereupon the float comes to rest at its zero or no flow position where it can be readily tested.

In operation, the screws 11 are adjusted until the level 45 conveniently mounted on the cover 29, indicates that the axis of the meter is in a vertical position whereupon the screws are locked in position to prevent displacement thereof. When there is no difference in pressure between chambers 25 and 26 the buoyancy of the liquid in the chamber 23 maintains the float 24 at the position shown in the drawing, or the float sinks until the head pressure of the mercury is equal to the total weight of the float. As the flow increases, the differential pressure between the two chambers will raise the float in the mercury in chamber 23 and the float will acquire a new balanced condition in which the buoyancy of the mercury and the force exerted by the differential pressure will be equalized by the weight of the float. It will be obvious that the greater the differential pressure the higher the float will be lifted. This rise of the float causes the displacer 39 and contact rods 38 to be submerged in the mercury in the contact chamber 28 and the higher the rise of the mercury, the greater the number of rods contacting with the liquid, and the less the resistance remaining in the meter circuit. The resistance unit is connected through leads 46 and 47 in a circuit usually containing indicating, recording and integrating instruments according to the particular demands. One such circuit arrangement is shown in Patent No. 1,325,763 above mentioned.

With the float stabilized to remain unassisted in upright operative position there is practically no resistance to its movement consequently it responds more freely to small changes in pressure and thereby increases the accuracy of indication of the instruments with which it is combined. This freedom of movement of the float is very desirable in the measurement of low differential pressures.

Having now described my invention, what I claim as new and desire to secure by Letters Patent is:

1. An improvement in meters comprising a casing, a wall in said casing dividing the interior thereof into two independent wells and a sealing liquid in the outer of said wells, a vessel in the interior well having a liquid therein, a bell having its lower edge immersed in said sealing liquid, means for subjecting the interior and exterior of said bell to differential pressure, a receptacle carried by said bell resting on the liquid in said vessel and subject to the flotative action of said liquid, a conducting liquid in said receptacle, the bell, receptacle and liquid therein forming a mass the center of gravity of which is below the center of buoyancy thereof whereby the bell maintains an upright position throughout its range of movement, impedance means including a displacer dipping into the conducting liquid and guide pins carried by the displacer for keeping the resistance elements centered with respect to the receptacle.

2. An improvement in meters comprising a casing having a sealing liquid therein, a vessel in said casing having a liquid therein, a bell float having its lower edge immersed in the sealing liquid and adapted to be moved by differences in pressure, a receptacle carried by said float, having a conducting liquid therein, and floating on the liquid in the vessel, the float and the parts carried thereby constituting a mass having its center of gravity below its center of flotation whereby the float maintains an upright operative position throughout its range of movement, resistance elements dipping into the conducting liquid and means supported by said resistance element for centering the resistance elements relative to the receptacle.

3. In a measuring instrument, the combination with a resistance unit comprising a series of graded contact rods the lower extremities of which terminate in the form of a helix, of a displacer carried by said unit and having the portion subtended by the helix tapered such that the cross-sectional area thereof at any point plus that of the rods at the same point is substantially a constant quantity.

4. In a measuring instrument, the combination with a resistance unit comprising a series of contact rods of gradually increasing length, of the conducting liquid adapted to make contact with said rods, and a displacer carried by said unit and having that portion, subtended by the shortest and longest rods, of a diameter such that the cross-sectional area of said conducting liquid at the point of contact with the rods remains a constant.

5. In a measuring instrument, the combination with a series of contact rods of graduated lengths, of means including a tapered displacer for compensating for the decreasing cross-sectional area of the rods from the shortest to the longest of said rods.

6. The combination with a stabilized float assembly for measuring instruments comprising an inverted cup shape member having its lower open end sealed by a liquid and a second cup shape receptacle attached to the top of the first member and containing a conducting liquid, of a second receptacle disposed about said last named receptacle and containing a third liquid, the said float assembly being supported by displacement in said third named liquid in such manner that center of gravity of the entire float assembly lies below center of buoyancy of said float assembly.

7. In combination, an impedance element, a conducting liquid adapted to contact with said impedance element at an exposed surface thereof, float means to contain said conducting liquid, a second liquid disposed about, and displaced by said float means in such manner that the center of gravity of the first liquid is below the center of buoyancy of the system in the second liquid and the float is rendered stable thereby.

FRANCIS A. FURLONG.